US 9,825,735 B2

(12) United States Patent
Lu et al.

(10) Patent No.: US 9,825,735 B2
(45) Date of Patent: Nov. 21, 2017

(54) NETWORK NODE AND METHOD THEREIN FOR HARQ PROCESSES IN A D2D COMMUNICATION (71) Applicant: Telefonaktiebolaget L M Ericsson (publ), Stockholm (SE)

(72) Inventors: Qianxi Lu, Beijing (CN); Qingyu Miao, Beijing (CN); Zhenshan Zhao, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 18 days.

(21) Appl. No.: 14/407,679

(22) PCT Filed: May 14, 2013

(86) PCT No.: PCT/SE2013/050540
§ 371 (c)(1),
(2) Date: Dec. 12, 2014

(87) PCT Pub. No.: WO2014/185836
PCT Pub. Date: Nov. 20, 2014

(65) Prior Publication Data
US 2015/0117274 A1  Apr. 30, 2015

(51) Int. Cl.
*H04W 72/04* (2009.01)
*H04J 3/00* (2006.01)
(Continued)

(52) U.S. Cl.
CPC ........ *H04L 1/1678* (2013.01); *G06F 9/44552* (2013.01); *G06F 9/5016* (2013.01);
(Continued)

(58) Field of Classification Search
CPC ... H04L 1/1678; H04L 1/1887; H04L 5/0007; H04L 5/00; H04L 1/16; H04L 1/18;
(Continued)

(56) References Cited

U.S. PATENT DOCUMENTS 7,284,244 B1 * 10/2007 Sankaranarayan ... G06F 9/5027
718/103
2012/0163252 A1 * 6/2012 Ahn .................. H04L 1/0003
370/280
(Continued)

FOREIGN PATENT DOCUMENTS

FI  WO 2010/097645 A1 *  9/2010  ............ H04W 72/04
KR  20130009598 A  1/2013
(Continued)

OTHER PUBLICATIONS

3GPP TS 36.213 v11.1.0 (Dec. 2012), Techinical Specification Group Radio Access Network; Evolved Universal Terrestrial Radio Access (E-UTRA); Physical Layer Procedures (Release 11).*
(Continued)

Primary Examiner — Edan Orgad
Assistant Examiner — Vanneilian Lalchinthang
(74) Attorney, Agent, or Firm — Murphy, Bilak & Homiller, PLLC (57) ABSTRACT In accordance with an example embodiment of the present invention, disclosed is a method and an apparatus thereof for handling a conflict resolution between storage requirements of multiple applications sharing the same data. A conflict resolution function resolves the conflicts in several steps and the result is either a coordinated merge of the different applications' storage requirements in multiple groups according to their needs and/or a controlled reduction of the relevance of some of the storage requirements for some applications.

18 Claims, 6 Drawing Sheets (51) Int. Cl.
*H04L 1/16* (2006.01)
*G06F 9/50* (2006.01)
*G06F 9/52* (2006.01)
*G06F 9/445* (2006.01)
*H04L 1/18* (2006.01)
*H04L 5/00* (2006.01)
*H04L 5/14* (2006.01)

(52) U.S. Cl.
CPC ............ *G06F 9/526* (2013.01); *H04L 1/1887* (2013.01); *H04L 5/0007* (2013.01); *H04L 5/14* (2013.01)

(58) Field of Classification Search
CPC ....... H04L 5/14; G06F 9/44552; G06F 9/526; H04W 72/04
USPC .......................................................... 370/280
See application file for complete search history.

(56) References Cited

U.S. PATENT DOCUMENTS

| | | | | |
|---|---|---|---|---|
| 2012/0243431 A1* | 9/2012 | Chen | ................ | H04W 72/0406 370/252 |
| 2013/0044652 A1* | 2/2013 | Wang | ................ | H04L 1/08 370/280 |
| 2014/0177502 A1* | 6/2014 | Kim | ................ | H04L 5/0055 370/311 |
| 2014/0269338 A1* | 9/2014 | Jung | ................ | H04L 5/0055 370/241 |

FOREIGN PATENT DOCUMENTS

| | | |
|---|---|---|
| WO | 2010097645 A1 | 9/2010 |
| WO | 2014089791 A1 | 6/2014 |
| WO | 2014092619 A1 | 6/2014 |

OTHER PUBLICATIONS

3GPP, "3rd Generation Partnership Project; Technical Specification Group Radio Access Network; Evolved Universal Terrestrial Radio Access (E-UTRA); Physical layer procedures (Release 11)", 3GPP TS 36.213 V11.1.0, Dec. 2012, 1-160.

* cited by examiner

NETWORK NODE AND METHOD THEREIN FOR HARQ PROCESSES IN A D2D COMMUNICATION

TECHNICAL FIELD

The application relates to methods of handling conflicting data storage requirements, and apparatuses arranged to handle conflicting data storage requirements and computer programs and computer program product therefore.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

A distributed data storage is a computer system where information or data is stored on more than one node. The data is often automatically replicated or duplicated over a large number of servers or nodes that are either located in the same physical location or distributed over the computer network. For example website servers have to be globally distributed for low latency and failover. Further, current applications require processing of huge amounts of data, which is achieved by distributed processing. Thus, the data may also be automatically partitioned so that the server contains only a subset of the total data. The replication and distribution of data over several nodes improves, inter alia, availability of the data.

In many solutions the same data set is shared between several applications. Each application may have different requirements on characteristics of the data storage. Some requirements may not be possible to fulfill at the same time by the same data storage. Some requirements may be contradictory, override or influence each other.

For example, according to the CAP theorem, also known as Brewer's theorem, it is impossible for a distributed system to simultaneously provide all three of the following requirements: consistency, availability and partition tolerance. It means that maximum two of the three requirements can be fulfilled by the same data storage.

In this context, consistency means that all nodes see the same data at the same time, i.e., the same data item has the same value when read from different replicas. Thus, a system is consistent if an update is applied to all relevant nodes at the same logical time. Availability means that every request received by a non-failing node in the system must result in a response. In other words, availability means that data can always be read from and written to a node, i.e., the system is continuously available. Partition tolerance means that a cluster can survive communication breakages that separate the cluster into multiple partitions unable to communicate with each other. Partition tolerant system thus works well across physical network partitions, i.e., the system continues to operate despite arbitrary message loss or failure of part of the system, e.g., if the network stops delivering messages between two sets of servers. In other words, the system is partition tolerant if processing can continue in all partitions in the case of a network failure causing partitioning.

In a system that may suffer partitions, as distributed systems do, the trade-off is between consistency and availability. If there is a partition in the network, either consistency or availability is lost. Either the system responds to all requests, potentially returning outdated reads and accepting conflicting writes (i.e., consistency is lost), or it refuses to respond to some requests to preserve data consistency (i.e., availability is lost).

Consistency can be improved by getting more nodes involved in the interaction, i.e. more interaction between the nodes is required for each write/update to guarantee that data is consistent in all nodes before response, which in turn increases latency (a response time). Another trade-off is thus between consistency and latency. In a consistent system all nodes need to be updated synchronously, which involves high latency. In case of asynchronous updates latency is low but data could be inconsistent between nodes. Also availability can be seen as a limit of tolerable latency; once latency is too high, data is regarded as unavailable.

In many instances, improving one requirement influences other requirements negatively. For example, inconsistencies can be reduced at the expense of availability and performance. Improving consistency may also have negative impact on multiple client support and horizontal scalability (that corresponds to partition tolerance). Improving availability or concurrency control (coordinating concurrent accesses to a data storage) and horizontal scalability in turn increases latency.

As a further example of contradictory or conflicting data storage requirements one can consider Fast Read versus Fast Write. It is assumed that it is not possible to adjust data storages for both Fast Read and Fast Write at the same time but it is necessary to choose either one of them or tune a data storage for values between Fast Read and Fast Write (i.e. medium Fast Read and medium Fast Write). More examples of conflicting data storage requirements will become evident in the detailed description of the drawings.

SUMMARY

An object of the embodiments of the invention is to address at least one of the issues outlined above, and this object is achieved by the methods and the apparatuses according to the appended independent claims, and by the embodiments according to the dependent claims.

According to one aspect of the invention, a method is provided for receiving a storage request regarding the same data from a plurality of applications, retrieving storage requirements in the received storage requests, detecting conflicting storage requirements, resolving conflicts caused by said conflicting storage requirements, wherein the resolving comprises dividing the plurality of applications into two or more groups of applications having non-conflicting storage requirements and selecting a storage request for each of said one or more group of applications, based on the storage requirements of each group.

According to another aspect of the invention, a method is provided for receiving a storage request regarding the same data from a plurality of applications, retrieving storage requirements in the received storage requests, detecting conflicting storage requirements, resolving conflicts caused by said conflicting storage requirements, wherein the resolving comprises reducing a relevance of at least one conflicting storage requirement for one or more applications to form one or more group of applications having non-conflicting storage requirements and selecting a storage request for each of said one or more group of applications, based on the storage requirements of each group.

According to yet another aspect of the invention, an apparatus is provided comprising a processor and a memory storing instructions that, when executed by the processor, cause the apparatus to receive a storage request regarding the same data from a plurality of applications, retrieve storage requirements in the received storage requests, detect conflicting storage requirements, resolve conflicts caused by said conflicting storage requirements by dividing the plurality of applications into two or more groups of applications having non-conflicting storage requirements and select a storage request for each of said one or more group of applications, based on the storage requirements of each group.

According to yet another aspect of the invention, an apparatus is provided comprising a processor and a memory storing instructions that, when executed by the processor, cause the apparatus to receive a storage request regarding the same data from a plurality of applications, retrieve storage requirements in the received storage requests, detect conflicting storage requirements, resolve conflicts caused by said conflicting storage requirements by reducing a relevance of at least one conflicting storage requirement for one or more applications to form one or more group of applications having non-conflicting storage requirements and select a storage request for each of said one or more group of applications, based on the storage requirements of each group.

According to yet another aspect of the invention, an apparatus is provided comprising a unit for receiving a storage request regarding the same data from a plurality of applications, a unit for retrieving storage requirements in the received storage requests, a unit for detecting conflicting storage requirements, a unit for resolving conflicts caused by said conflicting storage requirements by dividing the plurality of applications into two or more groups of applications having non-conflicting storage requirements, and a unit for selecting a storage request for each of said two or more groups of applications, based on the storage requirements of each group.

According to yet another aspect of the invention, an apparatus is provided comprising a unit for receiving a storage request regarding the same data from a plurality of applications, a unit for retrieving storage requirements in the received storage requests, a unit for detecting conflicting storage requirements, a unit for resolving conflicts caused by said conflicting storage requirements by reducing a relevance of at least one conflicting storage requirement for one or more applications to form one or more group of applications having non-conflicting storage requirements and a unit for selecting a storage request for each of said one or more group of applications, based on the storage requirements of each group.

According to yet another aspect of the invention, a computer program is provided comprising computer readable code units which when run on an apparatus causes the apparatus to receive a storage request regarding the same data from a plurality of applications, to retrieve storage requirements in the received storage requests, to detect conflicting storage requirements, resolve conflicts caused by said conflicting storage requirements, wherein the resolving comprises dividing the plurality of applications into two or more groups of applications having non-conflicting storage requirements and to select a storage request for each of said two or more groups of applications, based on the storage requirements of each group.

According to yet another aspect of the invention, a computer program is provided comprising computer readable code units which when run on an apparatus causes the apparatus to receive a storage request regarding the same data from a plurality of applications, to retrieve storage requirements in the received storage requests, to detect conflicting storage requirements, to resolve conflicts caused by said conflicting storage requirements, wherein the resolving comprises reducing a relevance of at least one conflicting storage requirement for one or more applications to form one or more group of applications having non-conflicting storage requirements and to select a storage request for each of said one or more group of applications, based on the storage requirements of each group.

It is an advantage of at least one of the aspects of the invention to reduce synchronization issues that may arise when the data is replicated to several data storages.

BRIEF DESCRIPTION OF THE DRAWINGS

For a more complete understanding of example embodiments of the present invention, reference is now made to the following description taken in connection with the accompanying drawings in which.

DETAILED DESCRIPTION

An example embodiment of the present invention and its potential advantages are understood by referring to FIGS. 1 through 7 of the drawings. For the purpose of explanation and not limitation, specific details are disclosed, such as particular scenarios and techniques, in order to provide a thorough understanding.

Moreover, it is apparent that the exemplary method and apparatus described below may be implemented, at least partly, by the use of software functioning in conjunction with a programmed microprocessor or general purpose computer, and/or using an application specific integrated circuit (ASIC). Further, the embodiments may also, at least partly, be implemented as a computer program product or in a system comprising a computer processor and a computer program product in the form of a memory coupled to the processor, wherein the memory is encoded with one or more computer programs that may perform the functions disclosed herein.

When several applications share the same data set with conflicting storage requirements, the data set might need to be duplicated on several data storages with different characteristics. This may cause synchronization issues. Alternatively some of the applications may have to compromise their requirements.

The embodiments of the present invention handles the conflict between storage requirements of multiple applications sharing the same data, either by a merge of the different applications' storage requirements in multiple groups according to their needs and/or by a controlled reduction or relaxation of some of the storage requirements for some applications. That is, the embodiments of the invention provide a method and an apparatus for handling conflicting data storage requirements. Storage requirements can be divided into two categories.

The first category comprises storage requirements leading to conflicts with each other. For example, consistency, availability and partition tolerance form a group of storage requirements where at least one may conflict with two others. That is, only two of them can be fully fulfilled at the same time by the same data storage. There are also several pairs of storage requirements that are contradictory to each other, such as Fast Write and Fast Read that cannot be provided by the same data storage at the same time. Further examples are temporal query support versus spatial query support. Spatial queries are queries like "List all places near my current location"; while temporal queries are queries related to time like "List all trains that reach Los Angeles after 6 a.m." Another example is availability versus failure recovery. Failure can be any kind of failure, like node failure in a distributed data storage. The system must be able to quickly make the data that is handled by the failed node available. In case fast failure recovery is not provided then high availability cannot be supported. Yet another example is usability versus data independence. Usability means that the API (application program interface) of the data storage should be easy to use for an application developer. Data independence means that changes in a structure of a data storage should not require changes in a computer program of its application. In this case, the actual conflict may also be regarded as data independence versus consistency.

The second category comprises storage requirements that can be aggregated or combined, and storage requirements where the most restrictive value needs to be selected in order to fulfill a storage requirement for all applications.

Examples of storage requirements that can be aggregated are a write frequency, a read frequency and a total number of open connections, to name a few. Taking a write frequency as an example, consider multiple applications requiring different write frequencies, e.g. application 1 expects to write 50 times per second (TPS), application 2 expects to write 100 TPS and application 3 expects to write 50 TPS. A selected data storage must fulfill the sum of all applications that write to the same data set, in this example 200 TPS, i.e., 50 TPS (App 1)+100 TPS (App 2)+50 TPS (App 3). The total number of open connections means the number of clients from a socket perspective. Another example is a data storage accessed from external processes (clients), wherein the data storage has limitations on the number of supported clients. If, for example, application 1 uses a specific port and application 2 uses another one, then the data storage requires two ports.

Examples of storage requirements for which the most restrictive value needs to be selected are latency, available bandwidth, retention period and type of queries, to name a few. For example, when multiple applications accessing a same data storage have different requirements regarding latency, the selected data storage must fulfill the most restrictive value. That is, if a read latency required by application 1 is 10 ms and application 2 requires 100 ms read latency, then both will be satisfied with a group maximum latency value of 10 ms. Available bandwidth requirement means that maximum required bandwidth is selected for the whole group of applications. Consider a system where all applications access the same data set and the number of data requests differs between the applications. Application 1 might use smaller chunk of data than application 2. Although both application 1 and application 2 share the same Table, application 1 may retrieve only field1, field2, and field3 of the Table, while application 2 always retrieves all fields from field1 to fieldn. Application 1 would require more bandwidth at equal TPS than application 2 because more data needs to be transferred at each transaction. The type of queries requirement is related to complexity of queries, i.e. complex versus simple. For example a get by primary key versus a get by secondary index key or via a complex query like SELECT field FROM TABLE a WHERE a.id IN (SELECT id from TABLE b WHERE field2>=2) GROUP BY field. For this storage requirement the most complex query type is selected as a requirement that the data storage must fulfill.

Figure 1:
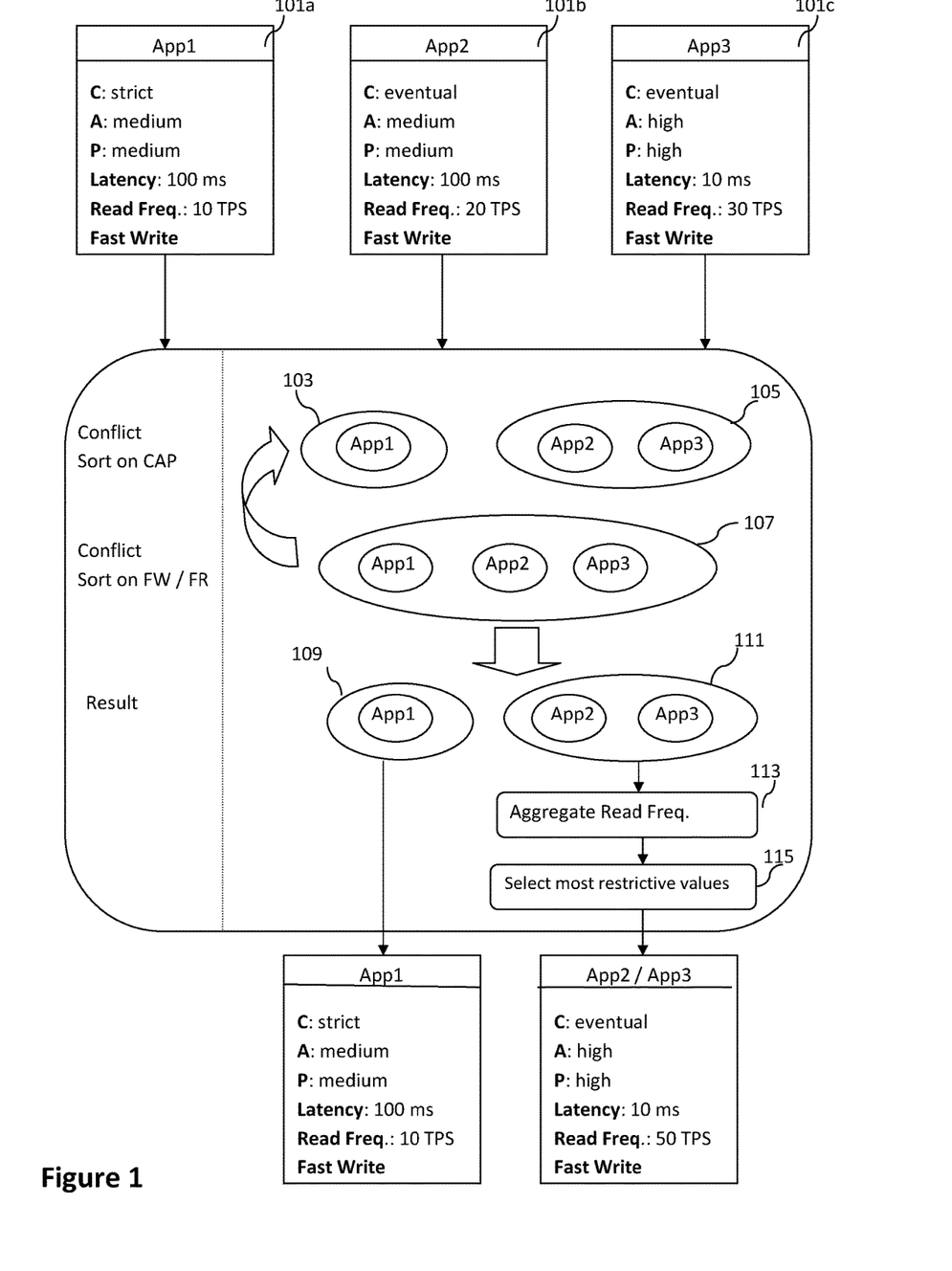
FIG. 1 illustrates an embodiment of the invention where a plurality of applications with different storage requirements request access to the same data.

FIG. 1 illustrates an embodiment of the invention where three different applications, App 1, 101*a*, App2, 101*b*, and App3, 101*c*, with different storage requirements, respectively, request access to the same data. In this illustrative example the conflicting storage requirements reflect the CAP theorem and Fast Read versus Fast Write conflict. The first step is to resolve storage requirements that are impossible to fulfill by a unique data storage because of conflicting CAP requirements and/or conflicting Fast Read and Fast Write requirements between the applications.

The CAP requirements of applications App1, App2 and App3 are examined at a first phase. A conflict is detected between these requirements as it is impossible to provide strict consistency, high availability and high partition tolerance at the same time. The applications are therefore divided into two groups. App1 with strict consistency requirement forms one group 103 while App2 and App3 with eventual consistency requirement form another group 105.

At the next phase, possible conflict between Fast Read and Fast Write is examined. In this case, all three applications require Fast Write. Thus, two groups 103 and 105 could be merged to form one group 107 based on Fast Write requirement. This newly formed group 107 is then re-examined to detect further CAP conflicts. A conflict is detected within group 107 as it is impossible to provide strict consistency, high availability and high partition tolerance at the same time. The resulting grouping is thus similar to the first phase grouping, where App1 forms one group 109 and App2 and App3 are grouped together as a group 111. Conflicts between storage requirements are now resolved by dividing applications into two groups 109 and 111.

Next step is to examine non-conflicting requirements within group 111 containing applications App2 and App3. Read frequency requirement is 20 TPS for App2 and 30 TPS for App3. These values are aggregated in block 113 to read frequency value 50 TPS for group 111. At block 115 the most restrictive value for latency requirement is selected. App2 requires 100 ms latency while App3 requires 10 ms latency. The most restrictive value is thus 10 ms that is selected as a latency requirement for group 111.

Resulting two groups of applications 109 and 111 have different storage requirements. Group 109 containing application App1 has the same requirements as App1 originally had, i.e. strict consistency with medium availability and partition tolerance, Fast Write, latency of 100 ms and read frequency of 10 TPS. Group 111 containing applications App2 and App3 has non-conflicting requirements for consistency (eventual), availability (high), partition tolerance (high) and Fast Write with aggregated requirement value for read frequency (50 TPS) and most restrictive value for latency (10 ms).

Figure 2:
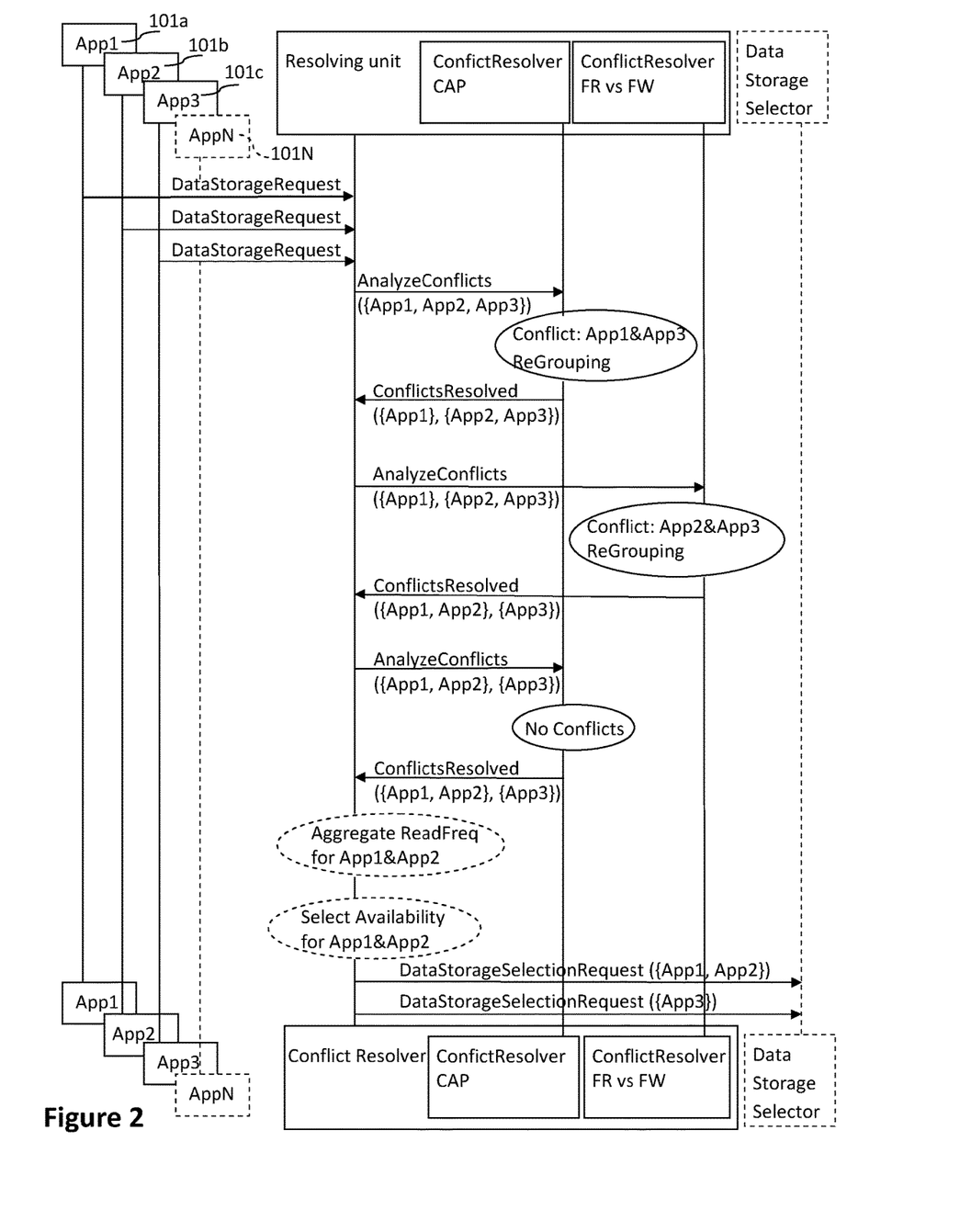
FIG. 2 illustrates one example embodiment of the invention.

FIG. 2 illustrates one example embodiment of the invention, in which N different applications, App1, 101a, App2, 101b, App3, 101c and AppN, 101N, may have different storage requirements. In this example, a resolving unit is divided into two conflict resolvers: a ConflictResolver_CAP for resolving the CAP conflicts and a ConflictResolver_FastWrite_vs_FastRead to resolve the Fast Read versus Fast Write conflicts. However, these conflict resolvers are logical units that are used in this figure in order to explain this embodiment, and do not necessarily correspond to any physical units but may be implemented via one or more computer programs stored on one or more memories.

The values of storage requirements of the three applications requesting storage of a shared (same) data are:

App1 (C=y, A=y, P=n, FR, Rfreq=10 TPS),
App2 (C=n, A=n, P=n, FR, Rfreq=20 TPS),
App3 (C=n, A=n, P=y, FW, Rfreq=10 TPS), where C is data consistency, A is data availability, P is partition tolerance, FR is Fast Read, FW is Fast Write and Rfreq is read frequency. Regarding CAP requirements 'n' means no and 'y' means yes, i.e., when C=y high data consistency is required while C=n means that the application does not require data to be highly consistent, when A=y data availability is required while A=n means that the application does not require data to be always available and when P=y the application requires partition tolerant data storage while P=n means that the application does not require partition tolerance.

Analysis of the storage requirements shows that aggregating requirements for the above combination of applications leads to two conflicts. Regarding CAP requirements, aggregating values of most strict requirements results: C=y and A=y and P=y, which would violate the CAP theorem. Regarding Fast Read and Fast Write requirements, a data storage can be tuned (or selected) for either Fast Read or Fast Write but it is notable to provide both at the same time.

The resolving unit requests the ConflictResolver_CAP to handle the CAP conflicts. Since there is a conflict between CAP requirements between App1 and App3, the result is to re-group the applications by dividing the applications into two groups. One group consists of App1 with high consistency requirement and another group consists of App2 and App3 with eventual consistency requirement. That is, the applications are divided into two initial groups of applications having non-conflicting CAP storage requirements within each group.

After the CAP conflicts have been resolved, the resolving unit requests the ConflictResolver_FastWrite_vs_FastRead to handle the Fast Read versus Fast Write conflicts. The initially suggested grouping is not possible as there is a conflict within a second group since App2 requires Fast Read while App3 requires Fast Write. A re-grouping is suggested where App1 and App2 form one group and App3 another group.

The new grouping is checked with the ConflictResolver_CAP and no further conflicts are detected. The proposed grouping is thus accepted.

The resolving unit then examines non-conflicting requirements within both groups. The read frequency values are aggregated for each group, i.e., in a first group consisting of App1 and App2 the read frequency values 10 TPS and 20 TPS are accumulated to result Rfreq=30 TPS for the first group. Further examination of the first group shows that App1 requires high data availability while App2 does not have this requirement. The most restrictive value for availability is selected resulting A=y for the first group.

One storage request for each group is then sent to the Data Storage Selector. The storage requests have the following storage requirements:

Group1 {App1 & App2} (C=y, A=y, P=n, FR, Rfreq=30 TPS),
Group2 {App3} (C=n, A=n, P=y, FW, Rfreq=10 TPS).

Figure 3:
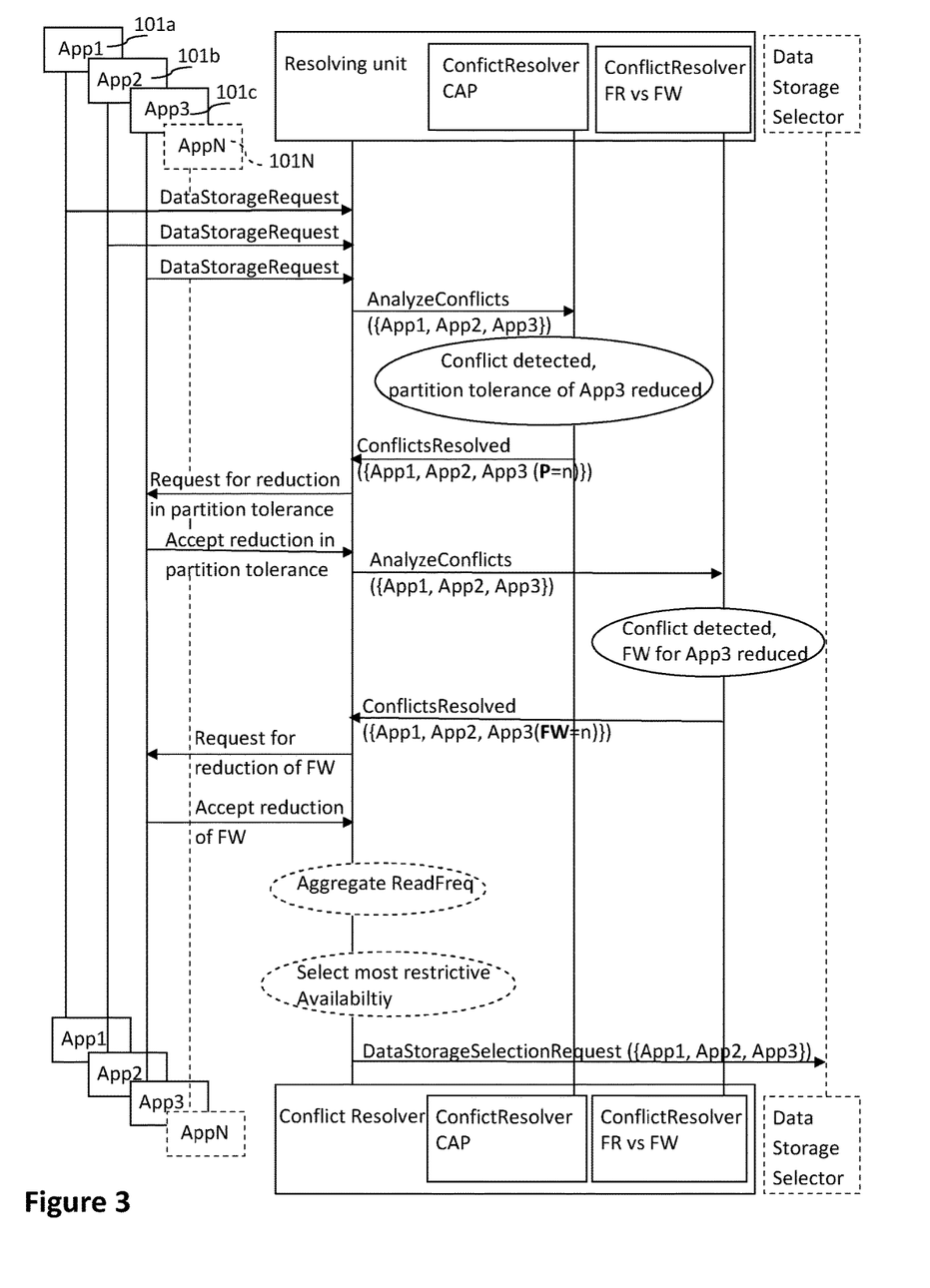
FIG. 3 illustrates another example embodiment of the present invention.

FIG. 3 illustrates another example embodiment of the present invention, also showing the N different applications in FIG. 2, App1, 101a, App2, 101b, App3, 101c and AppN, 101N, that may have different storage requirements, and the resolving unit, which is divided into two logical units. However, in this embodiment, the conflict between the different storage requirements is solved by the least prioritized application being requested to relax some of its storage requirements.

In this example the three applications request storage of a shared data with following storage requirements:

App1 (C=y, A=y, P=n, FR, Rfreq=10 TPS) pri=1,
App2 (C=n, A=n, P=n, FR, Rfreq=20 TPS) pri=2,
App3 (C=n, A=n, P=y, FW, Rfreq=10 TPS) pri=3, and App1 has higher priority than other applications (App2, App3, . . . AppN) as indicated by a 'pri' value.

The resolving unit requests the ConflictResolver_CAP to handle the CAP conflicts. Conflict in CAP requirements is detected because aggregating values of most strict requirements would result: C=y and A=y and P=y, which violates the CAP theorem. The detected conflict is resolved by reducing the relevance of (i.e. relaxing) partition tolerance requirement for the least prioritized application App3. In some embodiments of the invention, the resolving unit requests acceptance of the relevance reduction of a requirement from the corresponding application. That is, before handling possible further conflicts, a request for accepting reduction of the relevance of the partition tolerance requirement is sent to App3 which responds whether or not it accepts the reduction of the relevance of the partition tolerance requirement.

After the CAP conflicts have been resolved, the resolving unit requests the ConflictResolver_FastWrite_vs_FastRead to examine Fast Read and Fast Write requirements of the applications and handle detected Fast Read versus Fast Write conflicts. Since App1 and App2 require Fast Read while App3 requires Fast Write, it is decided that one or the other requirement needs to be selected for the whole group. App3 having the lowest priority of the three applications is thus requested to relax its Fast Write requirement. App3 responds that it accepts reduction of relevance of its Fast Write requirement. The three applications now form a group with non-conflicting storage requirements.

The resolving unit then examines the non-conflicting requirements within the group. The read frequency values are aggregated for the group, i.e., the read frequency values of 10 TPS of App1, 20 TPS of App2 and 10 TPS of App3 are accumulated to result Rfreq=40 TPS for the group. Further examination shows that App1 requires high data availability while App2 and App3 do not have this requirement. The most restrictive value for availability is selected resulting A=y for the group.

One storage request for all applications with following storage requirements (C=y, A=y, P=n, FR, Rfreq=40 TPS) is sent to the Data Storage Selector.

Although conflicts caused by conflicting storage requirements are resolved by dividing the plurality of applications into two groups of applications having non-conflicting storage requirements in the embodiment illustrated in FIG. 2, and by reducing the relevance of at least one conflicting storage requirement for an application in the embodiment illustrated in FIG. 3, it is understood by a skilled person that in some embodiments of the invention the conflict resolving techniques are combined. For example, the ConflictResolver_CAP, and/or the ConflictResolver_FastWrite_vs_FastRead, may first divide the applications into two or more groups and after further examination reduce the relevance of at least one storage requirement for one or more applications to reduce the number of groups. Alternatively one or the other the ConflictResolver_CAP, or the ConflictResolver_FastWrite_vs_FastRead, may divide applications into two or more groups and the other one of the ConflictResolver_CAP, and the ConflictResolver_FastWrite_vs_FastRead, may reduce the relevance of at least one storage requirement for one or more applications.

In one example embodiment, a grouping of applications according to the embodiment illustrated in FIG. 2 is first applied. However, it is possible that the resulting number of groups would be too high to be tolerable. In this case, the relevance of some storage requirements for one or more applications is reduced. In other words, if the grouping approach fails, then the reduction of relevance of storage requirements must be applied.

In all embodiments of the invention, the above described methods may be looped until a solution with a desired number of groups is reached. That is, at least part of the method, e.g. analyzing and resolving conflicts, is iterated until it converges to a solution. The desired number of groups may depend on number of applications requesting access to the same data, the number of different kind of storages available or some other implementation details. In general, the purpose is to keep the number of groups as small as possible. In some embodiments of the invention, the desired number of groups with non-conflicting storage requirements is one or two.

It is also to be understood that although in the description of example embodiments the CAP conflicts are resolved before resolving Fast Read versus Fast Write conflicts, the order of resolving those conflicts may be changed without changing the scope of the invention.

Although the example embodiments of the invention are described by showing how to resolve CAP conflicts and Fast Read versus Fast Write conflicts, there are many other conflicting storage requirements that can be resolved using the described method. To give some examples, the method may be used to resolve, inter alia, temporal query support versus spatial query support conflicts, availability versus failure recovery conflicts, and usability versus data independence conflicts. Further, in some embodiments of the invention the resolving unit may be divided into more than two conflict resolvers.

Figure 4:
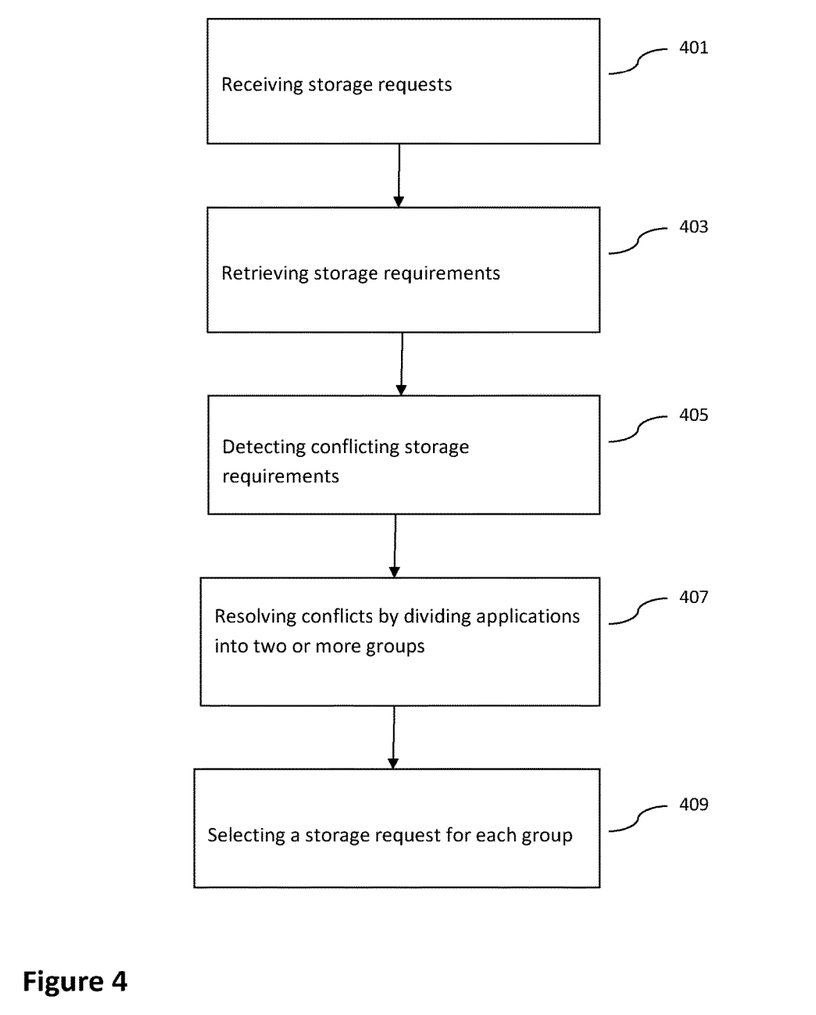
FIG. 4 is a flow chart illustrating an example method according to embodiments of the invention for resolving conflicts between storage requirements of different applications.
Figure 5:
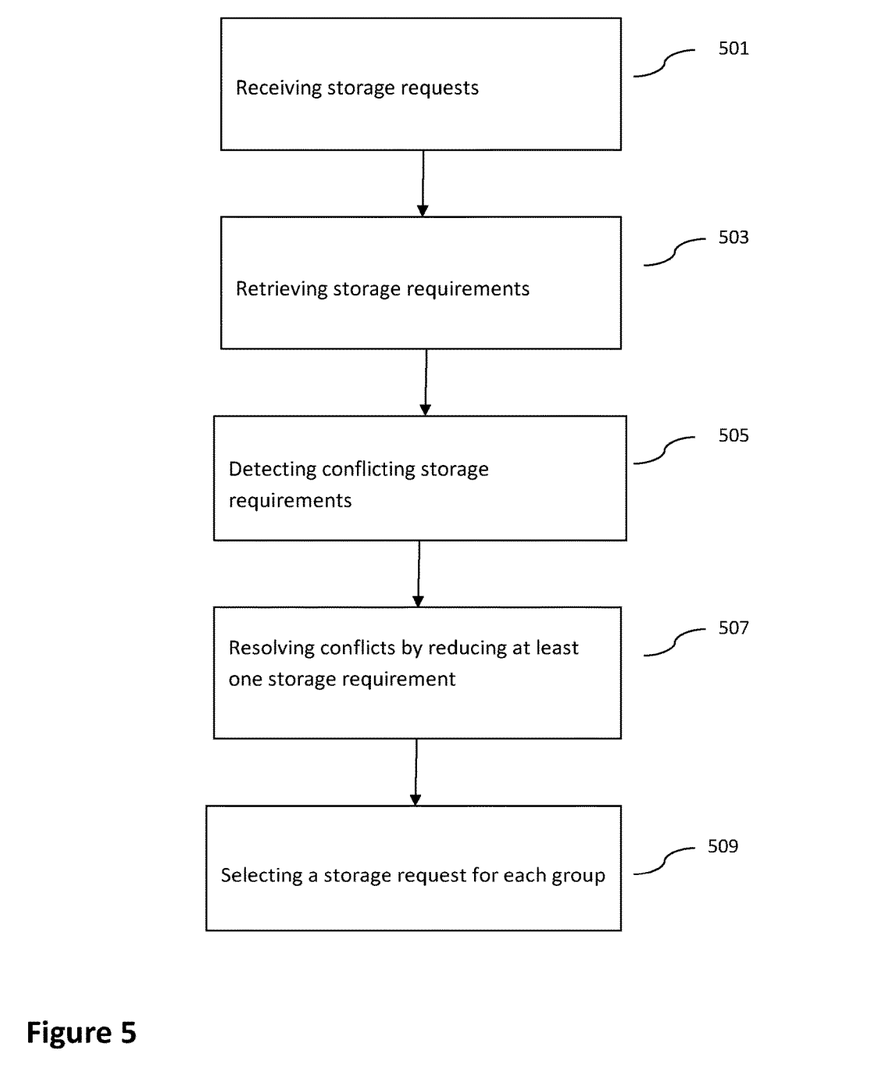
FIG. 5 is a flow illustrating another example method according to embodiments of the invention for resolving conflicts between storage requirements of different applications.

FIGS. 4 and 5 are flow charts illustrating two different embodiments of the invention for resolving conflicts between storage requirements of different applications. In a first step 401, 501 (in FIG. 4 and in FIG. 5, respectively) storage requests regarding the same data are received from a plurality of applications. In a second step 403, 503 storage requirements are retrieved from the received storage requests. Storage requirements may comprise requirements for example for data consistency, data availability, partition tolerance, data independence, temporal query support, spatial query support, node failure recovery, latency, read frequency, fast write or fast read. In a third step 405, 505 the retrieved storage requirements are analyzed. If conflicting storage requirements that cannot be fulfilled by one data storage are detected the method continues in a fourth step 407, 507.

In the steps 407 and 507 conflicts caused by the detected conflicting storage requirements are resolved. There are two ways to resolve the conflicts. They can be performed either alternatively or in combination. The first optional embodiment, shown in step 407 in FIG. 4, is to divide the plurality of applications into two or more groups having non-conflicting storage requirements. For example if some of the applications require Fast Read while the rest require Fast Write, the applications may be divided into two groups based on whether they require Fast Read or Fast Write. Further, if some of those applications requiring Fast Read also require high data consistency but others require high data availability, while all applications requiring Fast Write require high data consistency, the group based on Fast Read requirement may be further divided into two groups based on whether they require high data consistency or high data availability. This would then result three groups, one with Fast Read and high data consistency requirements, one with Fast Read and high data availability requirement and one with Fast Write and high data consistency requirements.

The second optional embodiment, shown in step 507 in FIG. 5, is to relax or reduce the relevance of at least one conflicting requirement for one or more applications instead or in addition to dividing the applications into groups. The reduction of the relevance of a conflicting requirement may be based on priority of the application and/or priority of the requirement. Taking the example above, instead of further dividing the Fast Read group it may be decided that the relevance of availability requirement is reduced. Resulting group then has Fast Read and high data consistency requirements. This decision may be based on priority of those applications requiring high data consistency. Or it may be based on priority of Fast Read requirement over availability requirement. Further, if also the relevance of Fast Write requirement can be reduced there is no need to divide the applications into two groups. In that case, all the applications are grouped together, the group having storage requirement with Fast Read and high data consistency.

In a fifth step 409, 509 a storage request is selected for each one or more groups of applications based on the storage requirements of each group. The selected storage request or requests may then be forwarded, e.g., to a data storage selector.

The above described methods may comprise a further step of examining non-conflicting storage requirements within one or more groups of applications. This step may comprise aggregating values associated with non-conflicting storage requirements and/or selecting the most restrictive value associated with non-conflicting storage requirements.

The various method steps shown in FIGS. 4 and 5 may be viewed as operations that result from operation of computer program code, and/or as a plurality of coupled logic circuit elements constructed to carry out the associated function(s).

Figure 6:
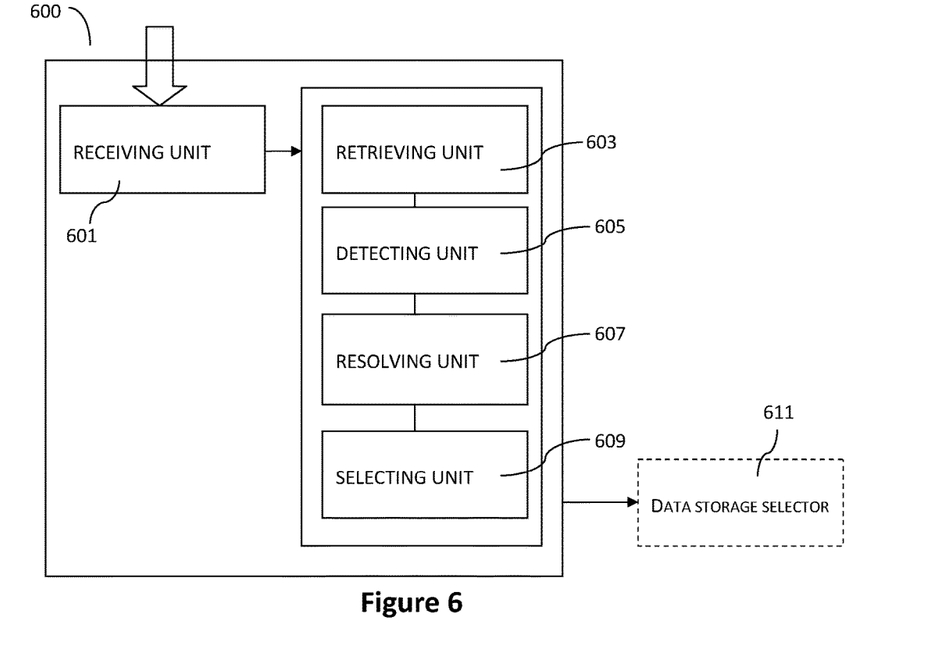
FIG. 6 shows an example of an apparatus according to an embodiment of the invention.

FIG. 6 shows an example of an apparatus 600 performing the method illustrated in FIGS. 4 and 5. The apparatus comprises a receiving unit 601 for receiving storage requests from a plurality of applications. Storage requirements are retrieved from the received storage requests by a retrieving unit 603 that is communicatively coupled to the receiving unit 601 and a detecting unit 605. The detecting unit 605 performs analyses on the retrieved storage requirements and if conflicting storage requirements that cannot be fulfilled by one data storage are detected, the next step is performed by a resolving unit 607 to which the detecting unit 605 is communicatively coupled. The resolving unit 607 may comprise one or more conflict resolvers and an aggregating unit. However, aggregation and/or selection of values of non-conflicting requirements may be performed by one of resolvers without a separate aggregating unit. Further, in some embodiments only one resolver is required for resolving conflicts. That is, the steps 407 and 507 may be executed by one or more resolvers depending on an implementation. Resolving unit 607 is communicatively coupled to or comprises a selecting unit 609 for selecting a storage request for each one or more groups of applications based on the storage requirements of each group. The selecting unit 609 communicates the selected storage request or requests, e.g., to a data storage selector 611. The data storage selector 611 performs a selection of a data storage for each group of applications based the storage requirements associated with the one or more storage requests.

It is to be noted that all units 601 to 611 may be implemented as a one unit within an apparatus or as separate units or some of them may be combined to form one unit while some of them are implemented as separate units. In particular, all above described units might be comprised in one chipset or alternatively some or all of them might be comprised in different chipsets. In some implementations the above described units might be implemented as a computer program product, e.g. in the form of a memory or as one or more computer programs executable from the memory of an apparatus.

Figure 7:
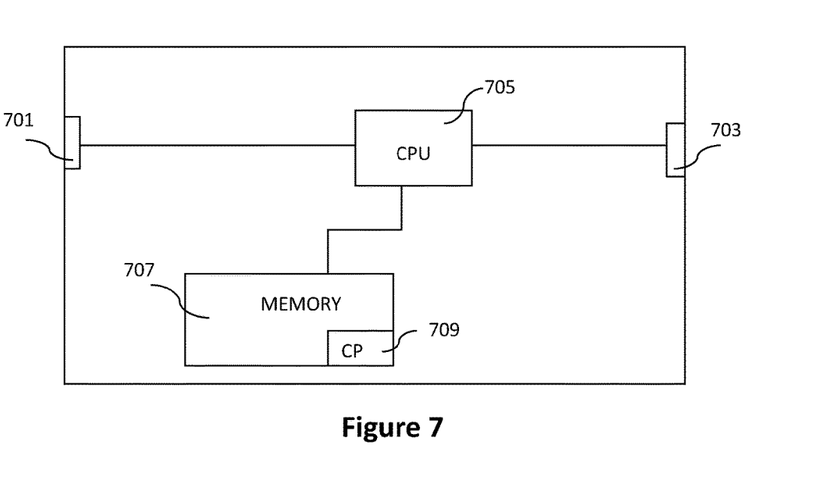
FIG. 7 shows further features of an example apparatus illustrated in FIG. 6.

FIG. 7 shows an alternative embodiment to the apparatus 600 or an embodiment of the apparatus 600, which herefurther comprises an input node 701 for receiving storage requests from a plurality of applications, and an output node 703 for transmitting storage request(s) to the data storage selector 611 or from the data storage selector 611 to the network depending on whether the data storage selector 611 is implemented as a part of the apparatus 600 or as a separate entity/node. A message format of received storage requests is not limited to any particular format but they may be transmitted, e.g., as HTTP (hypertext transfer protocol) requests, REST (representational state transfer) messages, SIP (session initiation protocol) messages, TCP (transmission control protocol) messages or UDP (user datagram protocol) messages, to name a few. The apparatus 600 here comprises a processor 705, e.g. a central processing unit (CPU), and a computer program product 707 in the form of a memory for storing the instructions, e.g. computer program 709 that, when retrieved from the memory and executed by the processor 705 causes the apparatus 600 to perform processes connected with embodiments of the present invention. In other words the computer program 709 and the processor 705 may correspond to the units 601-609 illustrated in FIG. 6. The processor 705 is communicatively coupled to the input node 701, to the output node 703 and to the memory 707.

The apparatus 600 may be or may be comprised in or associated with a server, a client, a network node or a cloud entity.

Although example embodiments of the invention were described for three applications to illustrate the invention, the number of applications is not limited to three or any other particular number of applications. Instead, the number of applications may be tens or even hundreds or thousands.

In case one (or more) of the applications does not need access to the shared data anymore, the apparatus 600 may examine the storage requirements of the remaining applications and apply the described conflict resolving method to form a different grouping or different aggregation/selection of non-conflicting requirements. In other words, it is possible to re-apply the conflict resolution function as if an application to be removed from a system never existed. This might result in a different grouping than the one in use, i.e., the original grouping. Another option is to ignore the removal of an application and to keep the existing groups except if the removal of the application(s) eliminates a group. For example, if a first group consists of applications App1 and App2 and a second group contains application App3 only, then removing App3 also removes the second group and its associated data storage.

One possible place where the described method and/or apparatus might be beneficial is a cloud. As per definition the cloud is where many resources are available and shared. Considering data storages as an example of the resources available in the cloud, and considering access to a certain data as a service on that resource in the cloud, it is natural that there can be multiple applications that need to use that service, i.e., access the same data.

Without in any way limiting the scope, interpretation, or application of the claims appearing below, a technical effect of one or more of the example embodiments disclosed herein is an optimization to fit a plurality of applications in one data storage with a controlled reduction of the relevance of a storage requirement for a less prioritized application or to group a plurality of applications according to their requirements for selecting the most appropriate data storage for each group.

Furthermore, the above mentioned and described embodiments are only given as examples and should not be limiting to the present invention. Other solutions, uses, objectives, and functions within the scope of the invention as claimed in the accompanying patent claims should be apparent for the person skilled in the art.

If desired, the different functions discussed herein may be performed in a different order and/or concurrently with each other. Furthermore, if desired, one or more of the above-described functions may be optional or may be combined.

The entities and units described above with reference to the figures are mainly logical units, which do not necessarily correspond to separate physical units.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The invention claimed is:

1. A method performed by a network node for scheduling Semi-Persistent Scheduling (SPS) transmissions of Hybrid Automatic Repeat reQuest (HARQ) processes in a Device-to-Device (D2D) communication between a first and a second wireless device in a wireless telecommunications network, which network node is configured to schedule the D2D communication on D2D compatible subframes of a radio frame in an Orthogonal Frequency-Division Multiplexing (OFDM) time-frequency grid, the method comprising:

for the SPS transmissions of the HARQ processes in at least one of a respective uplink and downlink (UL/DL) direction of the D2D communication, scheduling more than one D2D compatible subframe within a repetition periodicity of a determined Time Division Duplex (TDD) configuration of the D2D compatible subframes, by allocating transmission resources in a first one of the more than one D2D compatible subframes, and by allocating transmission resources in at least a second one of the more than one D2D compatible subframes, when the determined amount of transmission resources exceeds the available transmission resources in the first one of the more than one D2D compatible subframes; and transmitting the determined TDD configuration and information of the scheduling to the first and second wireless device.

2. The method of claim 1, wherein the information of the scheduling comprises the number of the more than one D2D compatible subframes scheduled for UL/DL and their locations in the OFDM time-frequency grid, and further comprises the number of transmission resources within each of the more than one D2D compatible subframes and their locations in the more than one D2D compatible subframes.

3. The method of claim 1, wherein the scheduling is performed by allocating transmission resources evenly over the more than one D2D compatible subframes.

4. The method of claim 3, wherein the transmitting further comprises transmitting a single HARQ process identity for UL/DL, respectively, when the D2D communication is a synchronous D2D communication.

5. The method of claim 1, wherein the transmitting further comprises transmitting, when the D2D communication is a synchronous D2D communication, a HARQ process identity for UL/DL, respectively, for each same-allocated-transmission-resource-size subset of subframes among the more than one D2D compatible subframes.

6. The method of claim 1, wherein the transmitting further comprises refraining from transmitting any HARQ process identity, when the D2D communication is an asynchronous D2D communication.

7. The method of claim 1, wherein the scheduling is performed such that the more than one D2D compatible subframes scheduled for UL/DL are allocated continuously from a specific starting subframe index.

8. The method of claim 1, wherein the TDD configuration of the D2D compatible subframes is determined based on a respective required amount of transmission resources for the HARQ processes of the D2D communication in UL/DL.

9. The method of claim 8, wherein the amount of transmission resources to be scheduled in the more than one D2D compatible subframes for SPS transmissions of HARQ processes in respective UL/DL is determined based on the repetition periodicity of the determined TDD configuration and the available D2D compatible subframes such that the amount of transmission resources fulfils said respective required amounts of transmission resources for the HARQ processes of the D2D communication in UL/DL.

10. A network node for scheduling Semi-Persistent Scheduling (SPS) transmissions of Hybrid Automatic Repeat reQuest (HARQ) processes in a Device-to-Device (D2D) communication between a first and a second wireless device in a wireless telecommunications network, which network node is configured to schedule the D2D communication on D2D compatible subframes of a radio frame in an Orthogonal Frequency-Division Multiplexing (OFDM) time-frequency grid, the network node comprises:

processing circuitry configured to, for the SPS transmissions of the HARQ processes in at least one of a respective uplink and downlink (UL/DL) direction of the D2D communication, schedule more than one D2D compatible subframe within a repetition periodicity of a determined Time Division Duplex (TDD) configuration of the D2D compatible subframes, by allocating transmission resources in a first one of the more than one D2D compatible subframes, and by allocating transmission resources in at least a second one of the more than one D2D compatible subframes, when the determined amount of transmission resources exceeds the available transmission resources in the first one of the more than one D2D compatible subframes, and further configured to transmit the determined TDD configuration and information of the scheduling to the first and second wireless device.

11. The network node of claim 10, wherein information of the scheduling comprises the number of the more than one D2D compatible subframes scheduled for UL/DL and their locations in the OFDM time-frequency grid, and further comprises the number of transmission resources within each of the more than one D2D compatible subframes and their locations in the more than one D2D compatible subframes.

12. The network node of claim 10, wherein the processing circuitry is configured to perform the scheduling by allocating transmission resources evenly over the more than one D2D compatible subframes.

13. The network node of claim 12, wherein the processing circuitry is configured to transmit a single HARQ process identity for UL/DL, respectively, when the D2D communication is a synchronous D2D communication.

14. The network node of claim 10, wherein the processing circuitry is configured to transmit, when the D2D communication is a synchronous D2D communication, a HARQ process identity for UL/DL, respectively, for each same-allocated-transmission-resource-size subset of subframes among the more than one D2D compatible subframes.

15. The network node of claim 10, wherein the processing circuitry is configured to refrain from transmitting any HARQ process identity, when the D2D communication is an asynchronous D2D communication.

16. The network node of claim 10, wherein the processing circuitry is configured to perform the scheduling such that the more than one D2D compatible subframes scheduled for UL/DL are allocated continuously from a specific starting subframe index.

17. The network node of claim 10, wherein the processing circuitry is configured to determine the TDD configuration of the D2D compatible subframes based on a respective required amount of transmission resources for the HARQ processes of the D2D communication in UL/DL.

18. The network node of claim 17, wherein the processing circuitry is configured to determine the amount of transmission resources to be scheduled in the more than one D2D compatible subframes for SPS transmissions of HARQ processes in respective UL/DL based on the repetition periodicity of the determined TDD configuration and the available D2D compatible subframes such that the amount of transmission resources fulfils said respective required amounts of transmission resources for the HARQ processes of the D2D communication in UL/DL.

* * * * *